United States Patent
Karterman

(10) Patent No.: US 7,529,025 B1
(45) Date of Patent: May 5, 2009

(54) AUDIO AND VISUAL DISPLAY

(76) Inventor: Don S. Karterman, 675 Birch St., Anchorage, AK (US) 99501

( * ) Notice: Subject to any disclaimer, the term of this patent is extended or adjusted under 35 U.S.C. 154(b) by 985 days.

(21) Appl. No.: 10/812,637

(22) Filed: Mar. 29, 2004

(51) Int. Cl.
G02B 27/10 (2006.01)

(52) U.S. Cl. ........................ 359/619; 359/626

(58) Field of Classification Search ......... 359/618–626, 359/811, 813, 896
See application file for complete search history.

(56) References Cited

U.S. PATENT DOCUMENTS

| | | | |
|---|---|---|---|
| 6,532,690 B1 * | 3/2003 | Vachette et al. | 40/454 |
| 6,865,033 B2 * | 3/2005 | Laverty | 359/819 |
| 6,995,914 B1 * | 2/2006 | Conley et al. | 359/619 |
| 2002/0163732 A1 * | 11/2002 | McKinley | 359/619 |
| 2003/0035220 A1 * | 2/2003 | Hawver | 359/626 |

* cited by examiner

Primary Examiner—Alicia M Harrington
(74) Attorney, Agent, or Firm—Michael J. Tavella; Gregory J. Nelson

(57) ABSTRACT

A lenticular assembly moveable to present a series of images to the viewer accompanied by a synchronized audible message. The assembly may be pivotal or on a slidable surface such as a door panel. The message may be pre-recorded or a sound loop for playback or may be on a programmable sound card so it can be changed or adjusted to the image speed.

9 Claims, 5 Drawing Sheets

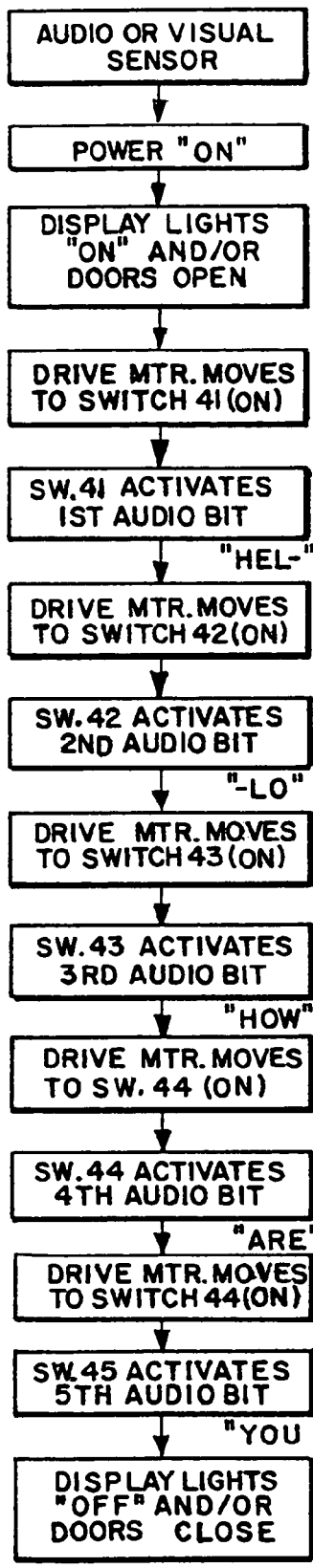
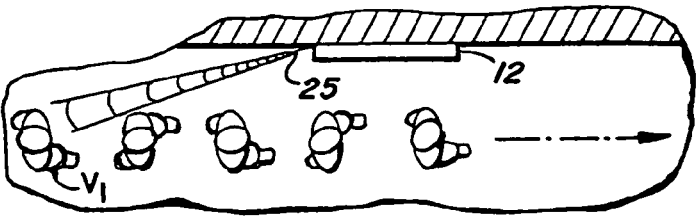
FIG. 6A
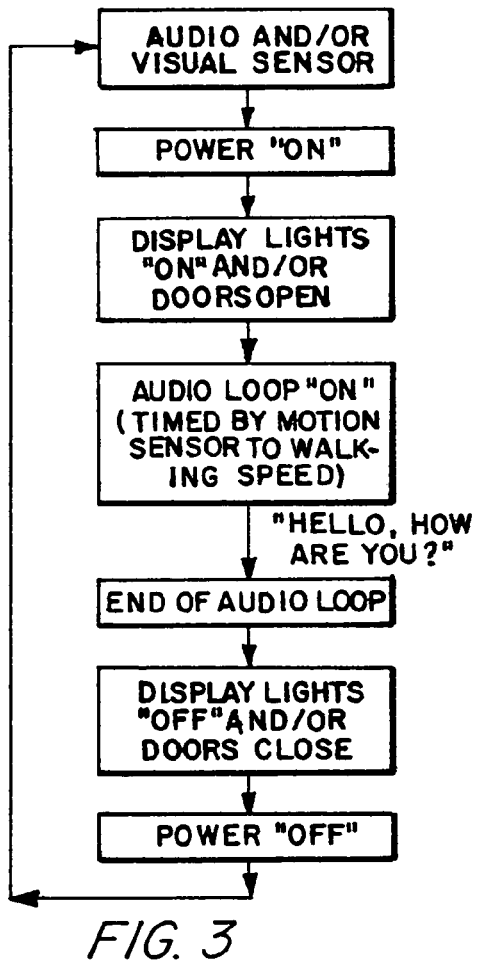
FIG. 3
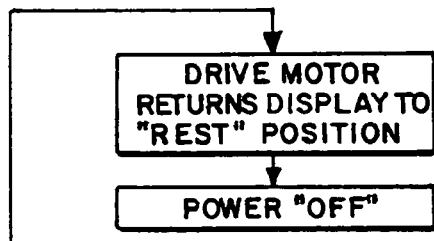
FIG. 6

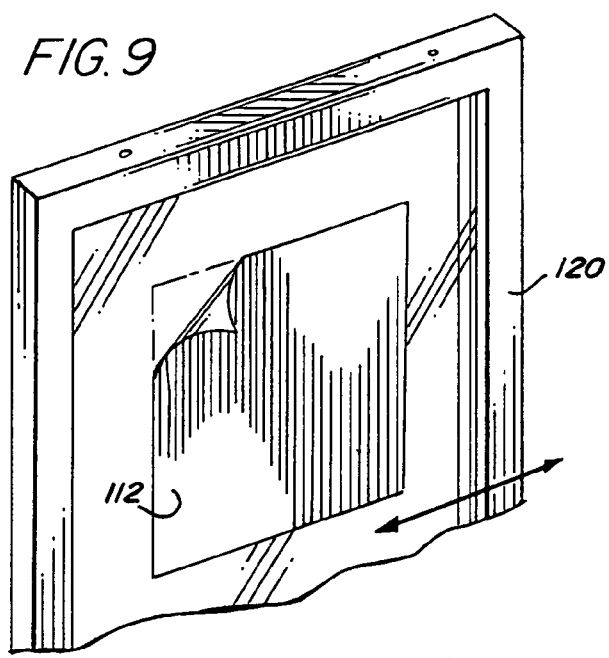
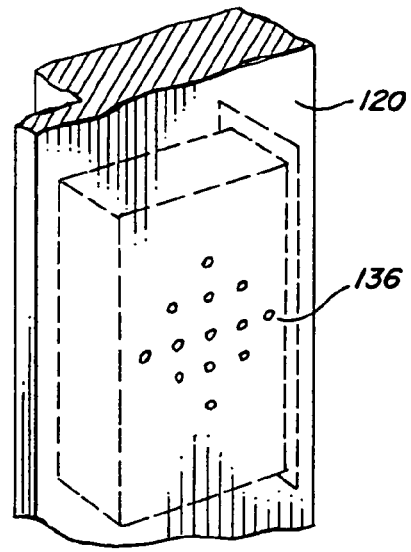
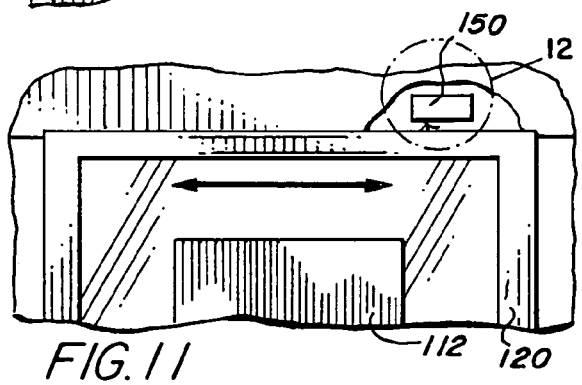
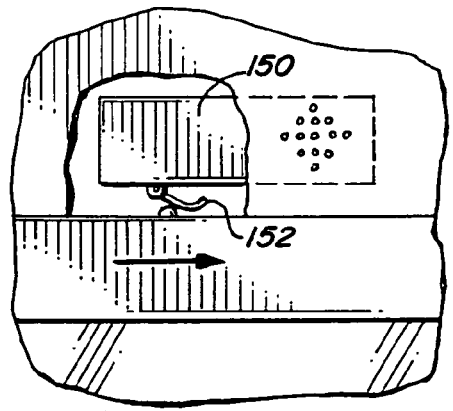
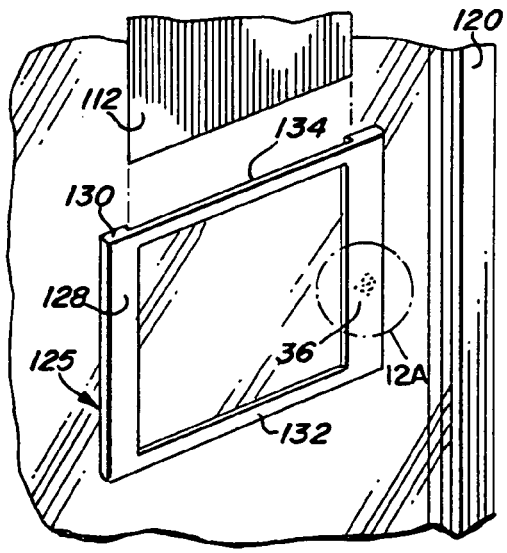
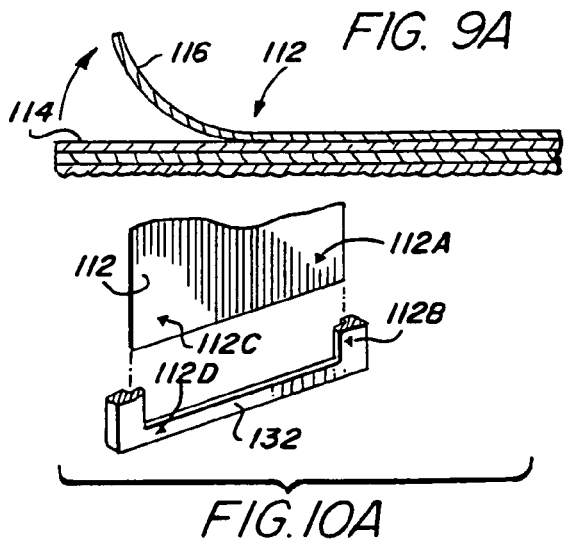

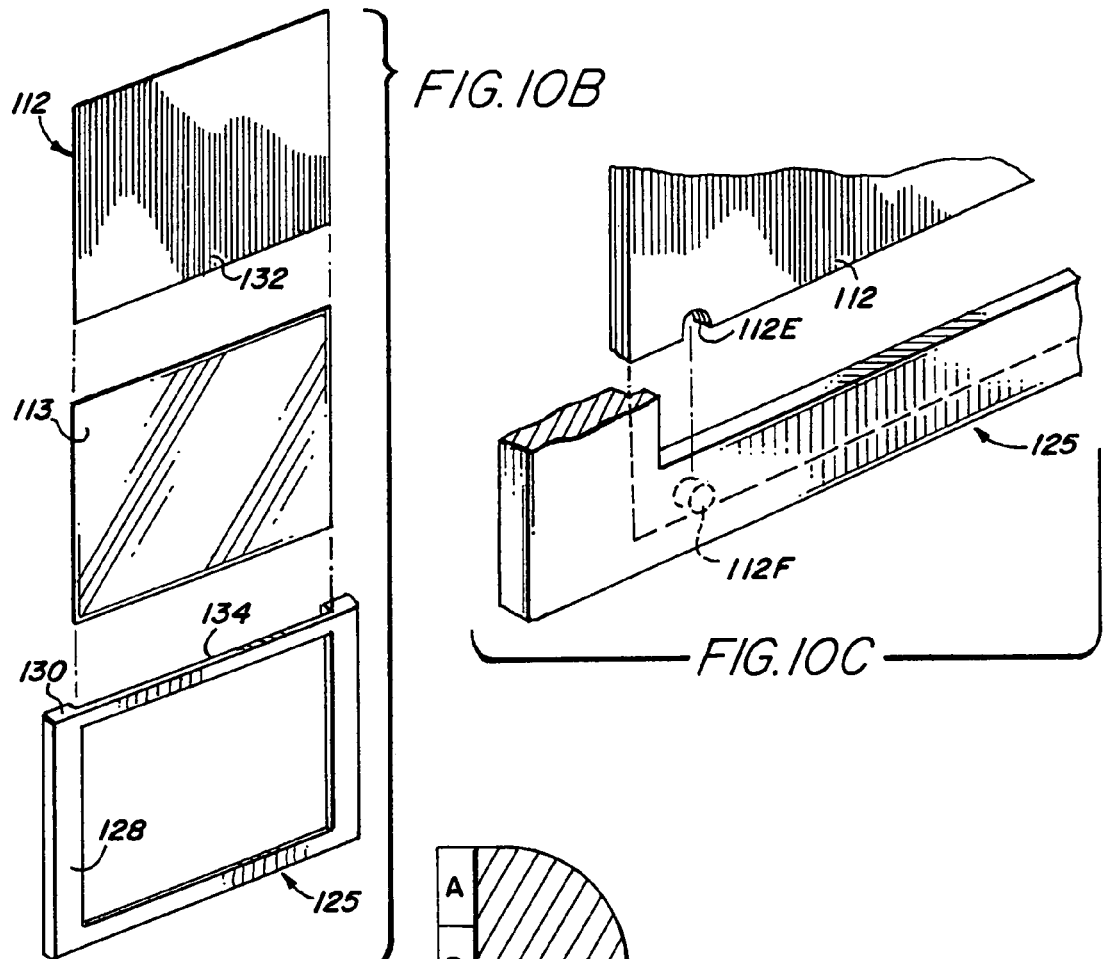
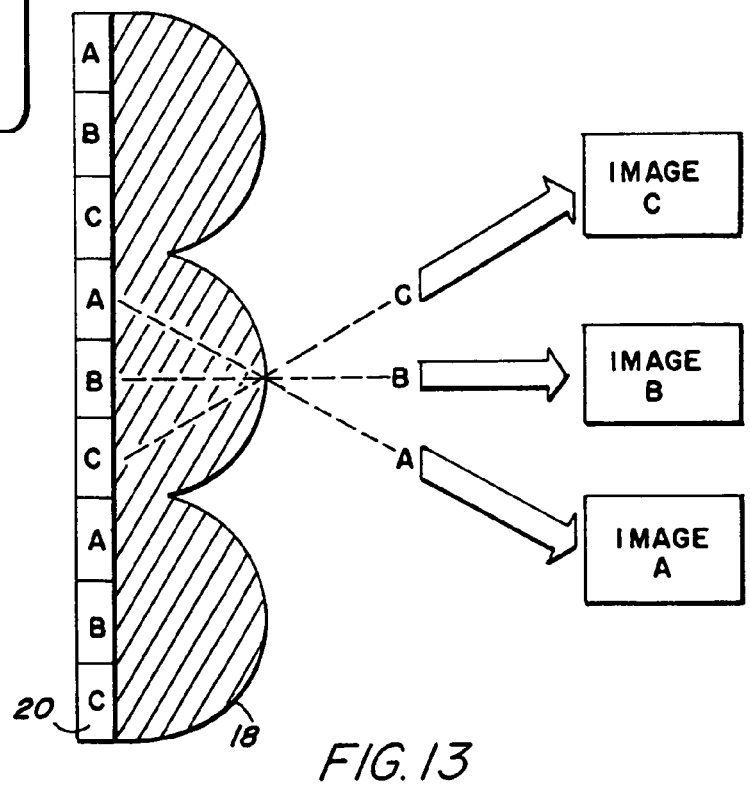
FIG. 13

AUDIO AND VISUAL DISPLAY

FIELD OF THE INVENTION

The present invention relates to a visual display and more particularly relates to a display having a lenticular optical component on which graphic images may be viewed and which may be accompanied by a synchronized audio message. A representative application is advertising or informational signing which may be manually actuated or remotely actuated by a sensor device sensing the presence of an individual within the viewing area.

BACKGROUND OF THE INVENTION

Lenticular lenses are well known and are commonly used to produce various optical effects. Such lenses generally comprise a transparent sheet having a planar surface on one side and a series of parallel longitudinal ridges on the other side. The series of parallel longitudinal ridges create a corresponding series of lenticular convex lenses termed "lenticules." An image sheet mounted on a planar surface includes at least two alternate series of spaced lines and images with each of the alternating series comprising a separate master image. The alternate images are optically related to the lenticules so as to be sequentially viewable upon change of the viewing position of the lens. Thus, in one viewing position one master image is visible and movement of the lens assembly or repositioning the viewer to another viewing position brings a second master image into view. Multiple images may be incorporated into a lenticular lens assembly. Various patents can be found in the prior art which relate to lenticular lens systems. As such, lenticular lenses are well known and have been applied in the past to various types of containers, packaging, toys, jewelry and signage.

Advertising signage is ubiquitous. The consumer today continually encounters informational advertising messages and signages of all types in almost all environments. Common among these are roadside billboards, displays and posters of all types in locations such as supermarkets, sports venues, airports, movie theaters and other locations where they are likely to be viewed by a large number of people. Many attempts have been made to provide such signage with graphics or other features which will cause the passerby to be attracted to the sign. These devices may include use of backlighting or special lighting effects. High definition graphics are often achieved by the use of video monitors such as high definition monitors. Motion, in some cases, is used to attract viewers. Advertisement signs that continually change throughout a time period are common, such as those that appear along the sidelines in sports arenas.

Thus, from the foregoing, it will be seen that a great deal of effort and expense is expended in creating signage which will attract viewership in order inform people, impart advertising information or to provide warnings such as traffic information. It is noted that traffic signs sometimes utilizes retroreflective materials to provide a high degree of visibility.

BRIEF SUMMARY OF THE INVENTION

Briefly, it is a broad object of the present invention to provide a visual display which, when viewed, provides the illusion of animation, morphing or motion and which sign is preferably accompanied by an audio message. In one embodiment, a sign has an image associated with a lenticular lens or other type of lens such as a fresnel lens associated with the image to provide a display which has the illusion of animation, morphing or movement as the angle of sight or viewing changes. The angle of the line of sight may be changed by moving or rotating the display during the viewing period to provide a series of images to the viewer. The device may be actuated either by a manual switch operated by the user or by a sensor which senses the presence of a user. Preferably an audio message is synchronized with the animation or series of images presented to the viewer. The audio message may be recorded on various media and may simply be a playback of a single loop. Alternatively, the movement or motion imparted to the sign to change the viewing angles to present various images may be transmitted to a switching device so that synchronous audio messages provided by the switching device in response to the motion or movement of the sign. For example, a typical message might be "hello, how are you" which would be accompanied by a series of images in which the speaker's mouth would change to give the appearance that these words or syllables are being spoken.

In an alternate embodiment, the image is associated with a lens, such as a lenticular lens, so that as the viewing angle changes, a different visual display is presented. The signage is associated with a motion sensor intended for installation in a location such as airport concourses where pedestrian traffic is normally passing by. A motion sensor will sense the approach of an individual at a predetermined location and distance with respect to the display. The motion sensor would initiate a series of actions such as illuminating the sign, opening any doors that may cover the sign and initiating an audio signal which is synchronized to the normal walking speed of a passerby. Thus, once actuated, the passerby's attention will be directed to the sign, either by display lighting, opening of the doors or an initial audio message. As the passerby continues in motion, the passerby's viewing angle or sight angle will change thus producing a series of images. The audio message will be synchronized to the walking speed so that as the viewer sees the various images a coordinated, synchronized message will be heard. The display may also be associated with moving objects such as automatic doors when opening or closing will present a visual display which may be accompanied by an audio message.

The audio and visual display of the present invention can be used for advertising messages, informational messages and, in some instances, may be applicable to signage such as traffic signs.

BRIEF DESCRIPTION OF THE DRAWINGS

The above and other advantages and objects of the present invention will be more fully understood and appreciated from the following description, claims and drawings in which:

FIG. 3 shows in detail the sequence of operations that occur when the system of FIG. 2 is activated;

FIG. 6 sets forth a series of events that occur with the system as shown in FIGS. 4 and 5;

FIG. 6A shows a lenticular display in a location such as a hallway or airport concourse activated by a sensor sensing the presence of a passerby;

FIG. 9 shows an automatic door similar to that shown in FIG. 8 in which the lenticular display is adhesively mounted to the door panel;

FIG. 9A is a cross-sectional view of the adhesive structure of FIG. 9;

FIG. 10 shows a sliding door with a frame-mounted lenticular display;

FIG. 10A shows a panel mounted frame with registration indicia;

FIG. 10B shows a panel mounted frame in an exploded view with a UV protective shield;

FIG. 10C shows a frame with alternate registration or indexing features;

FIG. 11 is a front view of an automatic door having a panel which opens which includes a frame which houses a motion switch, a slot for a sound card and audio system;

FIG. 12 is a detail view as indicated in FIG. 11;

FIG. 12A shows a section of a doorframe with a speaker; and

FIG. 13 is a schematic view of a lenticular display illustrating three images presented from different viewing angles.

DETAILED DESCRIPTION OF THE DRAWINGS

Figure 1:
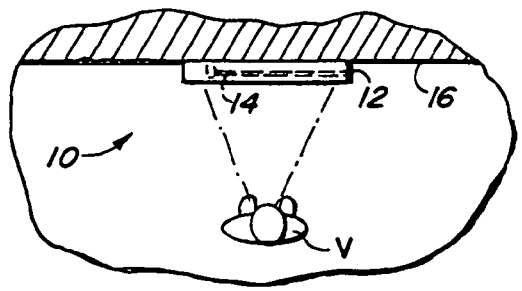
FIG. 1 shows a viewer observing a lenticular assembly to which motion is imparted to present a series of images or flips to the viewer.

Turning to the drawings, particularly FIG. 1, an embodiment of the invention is shown generally designated by the numeral 10. In this embodiment, the lenticular display 12 is pivotally mounted at 14 on a viewing surface 16. The viewing surface 16 may be a wall such as a wall in an area where viewers pass by such as an airport, public building or an area displaying arts. The lenticular display 12 is well known and is shown in FIG. 13, has two components a printed image 20 and a lenticular lens screen or lens 22 through which the image is viewed. The lenticular image displays one image after another as the angle of viewing is changed. In lenticular terminology, these images are called "flips" and up to 70 "flips" or images can be contained within a single lenticular display. Interlacing software is available which will print the selected images. The images are mounted behind the lenticular lens screen which is generally a sheet of plastic having a series of cylindrical lenses molded in parallel rib-like rows 18. Each of the lenses 18 is termed a "lenticule," having a focal length equal to a thickness of the clear plastic sheet and will magnify a very narrow strip of the image behind it. As the viewing angle is changed, the strip that is being magnified also changes. In FIG. 13, three images, A, B and C, are shown. The particular technology involved in formatting lenticular displays is well known. The display, as pointed out above, can present multiple images which can be advertising messages or simply images of interest.

Referring again to FIG. 1, the lenticular display is being viewed by a stationary viewer "V." A motion sensor 25, positioned either on the lenticular display or on the surface 16, senses presence of the viewer and will actuate the display. Motion sensors are well known and send out a beam of energy such as light or an infrared ray which, when broken, will actuate the device.

Figure 2:
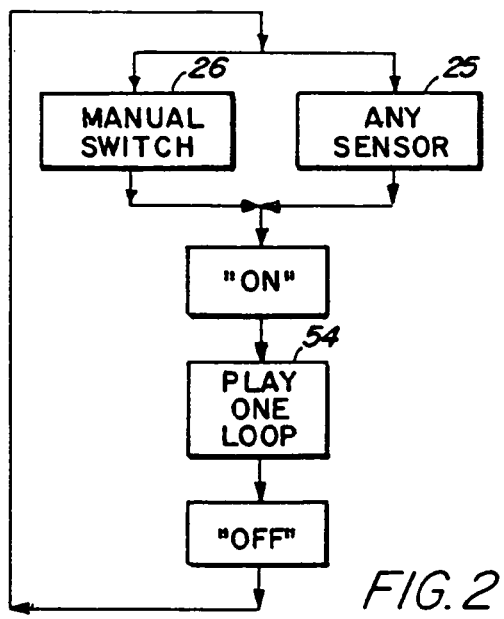
FIG. 2 is a schematic of one display system which may be incorporated into a lenticular assembly as shown in FIG. 1.
Figure 4:
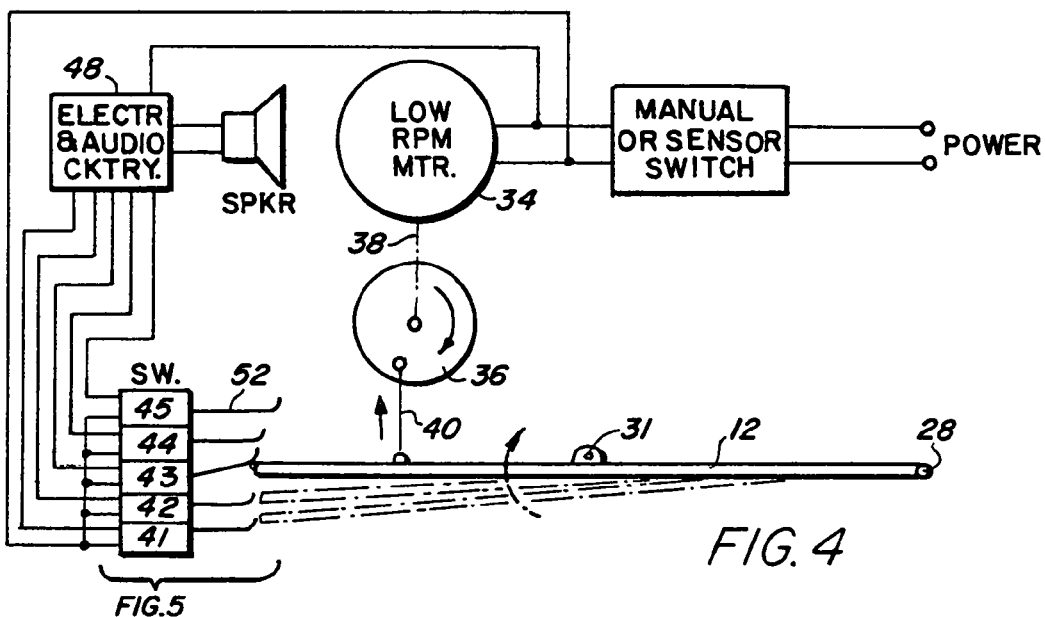
FIG. 4 illustrates an alternate embodiment of a lenticular system including a switching system which broadcasts a synchronized audio message.

Referring to FIGS. 2 and 4, the sensor can be any type of motion sensor or may alternately involve a manual switch 26 which can be activated by the viewer wishing to see the display. Lenticular lens display 12 is pivotal at an intermediate location 31, as best seen in FIG. 4. As the lenticular display 12 is pivoted, the viewing angle will change and the viewer "V" will see a series of images, such as A, B and C, which, for example, may be an advertising message. The sensor 25 will send either a signal, which may be wireless or hard-wired, to actuate the "on" switch. The "on" switch will actuate the motor 34 which is linked to an eccentric 36 by link 38. The eccentric is connected to the rear of the lenticular display 12 by a second link 40 so that as the motor rotates, the display 12 will be caused to oscillate presenting different images to the viewer "V."

The visual image may be accompanied by a synchronized audio message. A plurality of switches 41, 42, 43, 44 and 45 are connected to the audio circuitry 48 which may be a digital chip and speaker as shown. As the display moves, a contact 50 on the display will engage a series of contact strips 52 on the switches. This is shown in detail in FIG. 5. The switches 41 to 45 will be sequentially actuated to deliver a message such as "hello, how are you?". Obviously the number of switches may be selected in accordance with the length and type of audio message to be delivered to the viewer.

Thus, the viewer "V" standing, as in FIG. 1, will see a display such as the image of an individual that may be speaking and delivering the message "hello, how are you?". As the viewing angle changes, the image will also change so that the mouth of the individual appearing on the display will appear to be speaking. After a period of time, the display will "time-out" and can be reactivated either by the presence of an individual or actuation of a manual switch.

In the FIG. 4 embodiment, the synchronization of the audio message can be varied by simply adjusting the speed of the motor 34.

In FIG. 2, a loop recording 54 is played as the display is actuated and is prerecorded to coordinate with the sign movement.

The invention described above can also be utilized to present a series of "flips" or displays to viewers who are passing by, as seen in FIG. 6A. A typical application would be in an airport concourse where advertising signage is placed along the wall and people are passing by walking or on a moving sidewalk. In this instance, the presence of an individual viewer "V" would be sensed by a motion sensor 25. Thus, an individual passing by the signage on a moving sidewalk will enter the zone covered by the motion sensor 25. The motion sensor would activate the display 12 to pivot the display through viewing angle so that as the viewer passes by or is transported past the display on a moving sidewalk, the viewer will see a series of images. The images would preferably be accompanied by audio message synchronized to the displays. In the first approaching position V1, the viewer has intercepted the motion sensor 25 and actuated the display 12.

Figure 5:
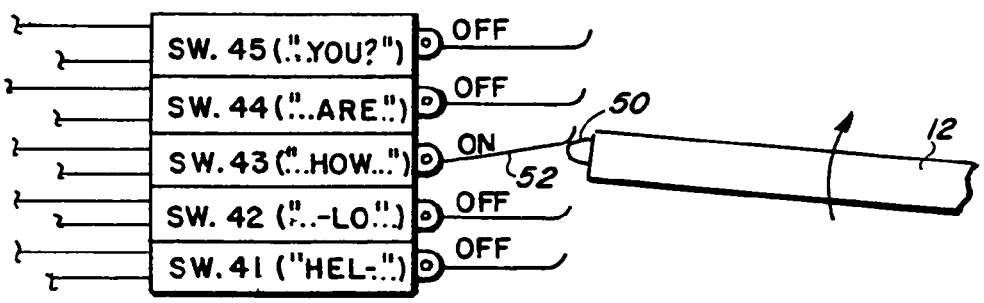
FIG. 5 is a detail view of the synchronization switch shown in FIG. 4.
Figure 7:
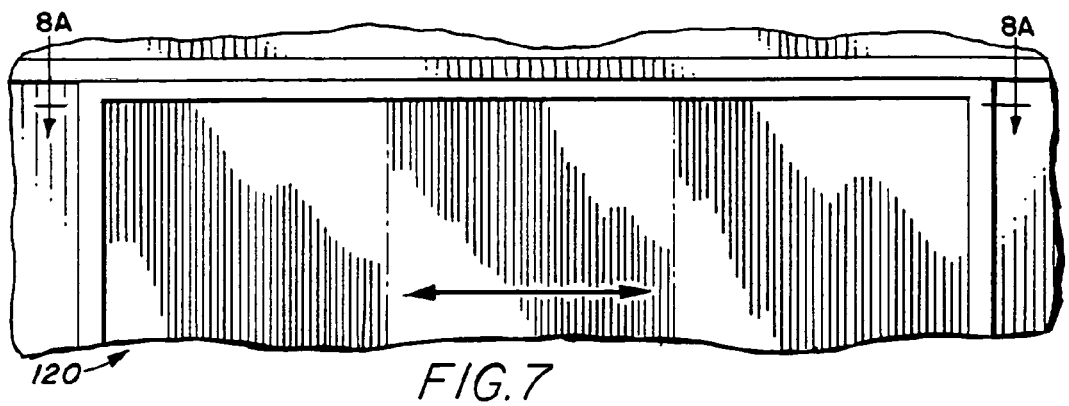
FIG. 7 is a front view of an automatic door having panels which open in opposite directions, each of which may carry a lenticular display adhered to the door surface.

FIG. 3 illustrates the sequential series of events that occur once the system shown in FIG. 2 is actuated. FIG. 6 sequentially illustrates a series of operations that occur when the system of FIGS. 4 and 5 is actuated. In latter instance, the viewer "V" has either manually or, by intercepting the motion sensing device, caused the power to come on. The display lights and, if the display is protected by a door or cover, the door will open. The drive motor is actuated and, as the frame of the display is pivoted, the contact on the display will sequentially contact a series of switches 41 through 45. Once the complete audio message has been delivered, any display lights will be turned off and the viewing door closed and the system will assume the initial operating position ready for reactivation.

Figure 8A:
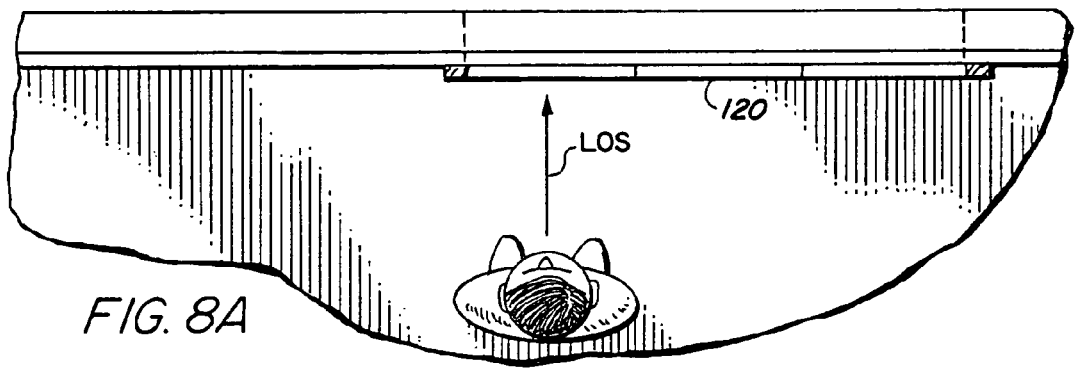
FIGS. 8A to 8C show a viewer observing a moving surface such as an automatic sliding door which, as the object moves, presents a series of images to the viewer.
Figure 8B:
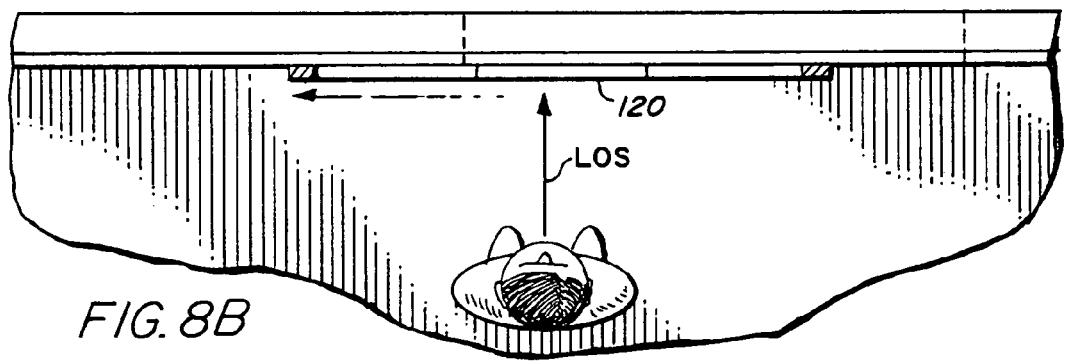
Figure 8C:
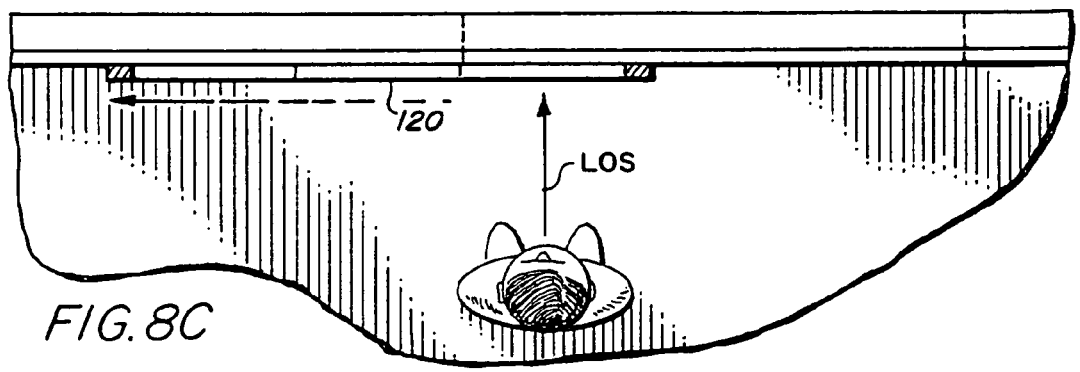

Motion may be imparted to the lenticular as has been described above with reference to FIGS. 1 to 6A. Motion may also be imparted by utilizing existing moving structures to which a lenticular display can be applied to carry an advertising message or simply to provide interest or amusement to viewers. In FIGS. 9 and 9A, a lenticular display 112 is shown attached to the surface of an automatic sliding door panel 120. The display 112 has an adhesive backing 114 which is protected by a peelable cover 116 which is removed at the time of application. The lens 18 is flexible and defines the lenticules as described. This embodiment facilitates easy mounting to a surface, as well as easy removal and replacement. The adhesive mounting would be particularly convenient for advertising and informational messages in entry locations such as retail establishments and supermarkets. The door panels 120 will move to allow individuals to access and exit an area. Generally the viewer will approach the door generally aligned with the center of the door as seen in FIGS. 8A to 8C. As the viewer approaches, the door panels will oppositely move by the door opening. This system will also work with doors which are sliding doors and move only in one direction.

As seen in FIG. 13, the lenticular display 112 has an image surface with a plurality of images, in this case representative images A, B and C. The lenticular lens display is applied over the door surface so that as the viewing angle changes, different images will be presented to the observer. As the observer approaches the opening along path "P," the door panel will slide as shown so that the movement of the door imparts different viewing angles. In the first door position, the viewer is presented viewing angle "A." As the viewer stops and views the door, the door moves to a position 2 and viewing angle "B" is presented which presents a different image to the individual. As the door slides further to the viewer's left, viewing angle "C" is presented in yet another image. It will be obvious that any practical number of desired images can be contained within the image display. Preferably the image display is adhered to the surface section, such as a moving door handle, by an adhesive on the rear of the image-bearing or graphic sheet.

In FIG. 10, another embodiment is shown similar to the previous embodiment for application to moving surfaces such as the panels 120 of automatic doors. In this embodiment, the display 112 bearing a selected number of images is, again, mounted behind a lenticular lens screen having a plurality of lenticules matched to the images. The image sheet and lenses are housed within a frame 125 which is shown as being generally rectangular having opposite sides 128, top 130 and bottom frame edges 132. The frame can be secured to the moving surface in a suitable fashion using fasteners or adhesives. The frame provides a receptacle for the display assembly 112 and allows the display assembly to be easily replaced. The display 112 will simply slide into the area behind the frame, preferably along a vertical slot 134 extending in the upper frame edge 132. Audio components may be mounted in the frame 125 at 136 to provide an audio output synchronized to the animation of the display images.

In both the embodiments shown in FIGS. 10 and 11, the display 112, including the lens and image sheet, can be inserted into the frame or, alternatively, the frame can include a permanently affixed lens with a plurality of lenticules. In this case, the image sheet would be printed, coordinated or interlaced with images and inserted into the frame immediately behind the lens.

In FIG. 10, the doorframe 128 provides a location for audio components 136. Preferably a compartment is provided in the doorframe and would incorporate audio components including a sound card, speakers and a power source such as batteries. The audio components can be activated by a motion switch which will sense movement of the door and activate the audio system. Preferably, the audio system includes provision to adjust the sound playback speed to synchronize with both the series of images presented as the door opens and the door opening speed.

In FIGS. 11, 11A and 12, the electronic audio components 136 are preferably contained in a portion of the moving door structure 120, such as the door frame at 150. The system is activated by movement of the door and may activated by a switch 152 extending from the doorframe 150 which is engaged by the door 120 upon opening and closing to initiate and to terminate delivery of the audio message. Instead of a contact switch 152, the switch may be optical switches which will initiate and terminate deliver of the audio message. The optical switches will sense movement of the door. Again, the recorded message is coordinated with the series of graphic images. As for example, if the automatic doors are at a retail location, the message may be "welcome to XYZ store" as a greeting to customers. The images A, B and C may be that of an individual speaking these words. If the graphics are changed, the sound card would be replaced so the system will deliver a message coordinated with the display. FIG. 12A shows the audio components 136 mounted in a vertical section of frame 120. The audio components may be as described with reference to any of the preceding figures.

Current technology also allows microchips to be programmed by downloading the new message from a hand-held storage unit onto a microprocessor which can be located either within the frame on the moving panel which houses the graphics or a fixed structure such as a door frame. It may be possible to centralize the microprocessing and locate the microprocessor at a central location in the store to facilitate changing the audio message. In this case, the system is activated by an optical switch which would either be wired to the processor at a central location or will send a remote, wireless signal to that location.

Note that the displays, as described above, can be placed on either or both sides of the automatic sliding door. The application of such a display with audio features to these locations have significant advantages. These locations are locations the customers see when first entering the store and when leaving the store. Thus, the display which advertises a product as the customer enters the store and has a purchasing intension should result in both greater sales and greater goodwill for the store. However, it is again emphasized that the display of the present invention is not limited to the presentation of advertising messages both visual and audio, but also to all types of signage including informational signage and artistic displays for the enjoyment of patrons.

In FIG. 10A, the frame 128 receives image 120. To insure proper alignment, the frame and the lens assembly have cooperating registration indicia 112C and 112D.

In FIG. 10C, proper registration of the lens assembly is provided by registration notch 112E in the lower edge of the image assembly 120 which engages a projection 112F in the lower section of the frame. Registration is necessary when the frame permanently includes the lens, not shown, and the images appear on image sheet 120 which is changed from time to time.

In FIG. 10B, the lenticular assembly 112, including an image sheet and lens 132 is inserted into a slot 134 in frame 128. The frame may be mounted on a moving panel as described above. A protective UV shield 113 is inserted in front of the assembly 112 so the assembly may be positioned in locations where it may be subject to radiation.

The lens and the display will have to be properly registered, that is, the images will have to be aligned with the lens lenticules which would, for this application, be vertically extending. If three images are to be displayed, then the lens will have a plurality of sets of three lenticules to provide three different images at different viewing angles.

Proper registration can be accomplished by either providing registration marks or notches in a marginal area of the pre-printed image display as seen in FIG. 10A. The registration marks or notches will be engaged or aligned with reference markings or projections on the frame to provide proper registration. Alternately, the pre-printed image could be mounted in an interior frame which is received in channels in the exterior frame. The position of the display in its frame and the channels in the exterior frame will be selected to cooperate to provide proper registration.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A display device comprising:
   (a) a lenticular lens assembly having an associated graphic component whereby different images are presented to a viewer when observed at different viewing angles;
   (b) means for securing said assembly to a sliding door, being mounted in a frame; and
   c) wherein the different images comprise a sequential set of images that become visible to a person sequentially as the sliding door moves.

2. The display device of claim 1 wherein said frame includes a compartment containing audio circuitry.

3. The display device of claim 2 wherein said audio circuitry includes a microprocessor, a power source, a speaker and a proximity switch for activating said circuitry to produce an audio message.

4. The display device of claim 3 wherein said microprocessor is programmable.

5. The display device of claim 3 wherein said audio message is synchronized with said images.

6. The display device of claim 2 wherein said audio circuitry includes a sound recording, a power source, a speaker and means for activating said circuitry to produce an audio message synchronized with said door movement.

7. The display device of claim 6 wherein said means for activating said circuitry comprises switch means in operative communication with said door as it moves.

8. The display device of claim 1 wherein said door is an automatic door.

9. The display device of claim 8 further comprising a proximity sensor such that said door operates when a person activates said proximity sensor.

* * * * *